(12) United States Patent
Hu et al.

(10) Patent No.: US 12,561,572 B2
(45) Date of Patent: Feb. 24, 2026

(54) METHOD FOR CALIBRATING PARAMETERS OF HYDROLOGY FORECASTING MODEL BASED ON DEEP REINFORCEMENT LEARNING

(71) Applicant: HOHAI UNIVERSITY, Nanjing (CN)

(72) Inventors: Hexuan Hu, Nanjing (CN); Qiang Hu, Nanjing (CN); Ye Zhang, Nanjing (CN); Zhenyun Hu, Nanjing (CN)

(73) Assignee: HOHAI UNIVERSITY, Nanjing (CN)

( * ) Notice: Subject to any disclaimer, the term of this patent is extended or adjusted under 35 U.S.C. 154(b) by 707 days.

(21) Appl. No.: 17/906,995

(22) PCT Filed: Mar. 2, 2022

(86) PCT No.: PCT/CN2022/078763
§ 371 (c)(1),
(2) Date: Sep. 22, 2022

(87) PCT Pub. No.: WO2022/206265
PCT Pub. Date: Oct. 6, 2022

(65) Prior Publication Data
US 2023/0281459 A1 Sep. 7, 2023

(30) Foreign Application Priority Data

Apr. 2, 2021 (CN) .......................... 202110361225.X

(51) Int. Cl.
*G06N 3/092* (2023.01)
(52) U.S. Cl.
CPC .................................... *G06N 3/092* (2023.01)
(58) Field of Classification Search
None
See application file for complete search history.

(56) References Cited

U.S. PATENT DOCUMENTS 9,679,258 B2 * 6/2017 Mnih ...................... A63F 13/67
2019/0340940 A1 11/2019 Elkabetz et al.

FOREIGN PATENT DOCUMENTS

CN 103366099 A 10/2013
CN 111768028 A 10/2020
(Continued)

OTHER PUBLICATIONS

Tian et al. "Real-Time Model Calibration With Deep Reinforcement Learning", 2020 arXiv (Year: 2020).*
(Continued)

*Primary Examiner* — Amresh Singh
(74) *Attorney, Agent, or Firm* — JC ONE WORLD

(57) ABSTRACT

A method for calibrating parameters of a hydrology forecasting model based on a deep reinforcement learning includes selecting according to basin characteristics, and the parameters and parameter value ranges to be calibrated by the model are determined. The method includes a calibrating the parameters of the hydrology forecasting model is established, and three elements of the reinforcement learning, that is, a state space, an action space and a reward function are determined. The method includes a deep reinforcement learning method DQN is applied to optimize the parameters to be calibrated by the hydrology forecasting model. In the present disclosure, by setting a stride length of the action value for the deep reinforcement learning model, an accuracy finally optimized by the calibration parameters can be freely controlled, and a DQN algorithm is adopted to search the entire space for the calibration parameters to ensure the optimality for optimizing the calibrated parameters.

4 Claims, 3 Drawing Sheets

(56)           References Cited

FOREIGN PATENT DOCUMENTS

CN        111795681  A      10/2020
CN        113255206  A       8/2021

OTHER PUBLICATIONS

Wang et al., "Smart Stormwater Control Systems: A Reinforcement
Learning Approach", ISCRAM (Year: 2020).*
International Search Report and Written Opinion issued in Interna-
tional Patent Application No. PCT/CN2022/078763; mailed May
11, 2022; 8 pgs.

* cited by examiner

METHOD FOR CALIBRATING PARAMETERS OF HYDROLOGY FORECASTING MODEL BASED ON DEEP REINFORCEMENT LEARNING

RELATED APPLICATIONS

The present application is a U.S. National Phase of International Application Number PCT/CN2022/078763, filed Mar. 2, 2022, and claims priority to Chinese Application Number 202110361225.X, filed Apr. 2, 2021.

TECHNICAL FIELD

The present disclosure belongs to the technical field of calibrating parameters for hydrology forecasting models, and in particular to a method for calibrating parameters of a hydrology forecasting model based on a deep reinforcement learning.

BACKGROUND

Hydrology forecasting models are widely applied in the fields, such as rainfall simulation forecasting, flood forecasting and early warning, hydrology process analysis, and play an important role in improving the efficiency of hydrology research. Since the structures of hydrology forecasting models are generally complex, the determination of the model parameters after the model is established has become a core problem to be solved urgently. Parameter calibration is to find a group of optimal parameter solutions in the hydrology forecasting model, so that the simulated and forecasted results are as close as possible to the measured data. For hydrology forecasting models, the accuracy of forecasting is directly affected by parameter calibration. Therefore, it is of great scientific significance and application value to study how to improve the speed and accuracy of parameter calibration.

The traditional manual trial and error method, gradient descent method, etc. are mostly adopted in the early methods for calibrating parameters of the hydrology forecasting models. Although these methods are intuitive, they require high experience of the staff and are easily affected by personal subjectivity, and the efficiency and accuracy for calibrating parameters are relatively low. With the development of computer technology, modern intelligent algorithms such as genetic algorithm and particle swarm algorithm are widely applied in the field of automatic parameter calibration of the hydrology forecasting models, which eliminates the deficiencies of the traditional methods. However, modern intelligent algorithms can retrieve a wide range of solutions, but there are problems of premature and being prone to falling into the local optimal solutions, which affects the selection of the global optimal solutions.

SUMMARY

The objectives of the present disclosure are to overcome the defects of the prior art and provide a method for calibrating parameters of a hydrology forecasting model based on a deep reinforcement learning. In the present disclosure, the accuracy finally optimized by the calibration parameters can be freely controlled by setting the stride length of the action value for the deep reinforcement learning model, and a DQN algorithm is adopted to search the entire space for the calibration parameters so as to ensure optimality for optimizing the calibration parameters, so as to avoid the problem that the modern intelligent algorithms are premature and prone to falling into the local optimal solutions.

In order to solve the above technical problems, the following technical solutions are adopted in the present disclosure.

Provided is a method for calibrating parameters of a hydrology forecasting model based on a deep reinforcement learning. The method includes the following steps.

In Step 1, a hydrology forecasting model is selected and parameters that need to be calibrated are determined; the hydrology forecasting model takes a rainfall time sequence and an evaporation time sequence as inputs, and takes a time sequence of a forecasted flow as an output.

In Step 2, a reinforcement learning model for calibrating the parameters of the hydrology forecasting model is established; the reinforcement learning refers to a process of an interactive learning between an intelligent agent Agent and environment, and three key elements for the reinforcement learning are a state space, an action space and a reward value function.

In Step 3, a deep reinforcement learning method DQN is applied to optimize the parameters to be calibrated by the hydrology forecasting model.

Furthermore, a process of selecting a hydrology forecasting model and determining the plurality of parameters to be calibrated in Step 1 includes the followings.

A different hydrology forecasting model is selected according to basin characteristics, and the parameters that need to be calibrated by the hydrology forecasting model are determined, where N is a number of parameters that need to be calibrated by the hydrology forecasting model;

The values for each parameter are in a range of:

$$w_{min}^i \le w^i \le w_{max}^i, i = 1, 2, \ldots, N,$$

where $w_{min}^i$ and $w_{max}^i$ are a minimum value and a maximum value for an i-th parameter to be calibrated, respectively.

Moreover, the process of establishing the reinforcement learning model for calibrating the parameters of the hydrology forecasting model in Step S2 includes the following steps.

2-1) Determining the State Space for the Reinforcement Learning:

A state value for the reinforcement learning at a time t is defined as a one-dimensional vector $s_t$ composed of the plurality of parameters to be calibrated in the hydrology forecasting model;

$$s_t = (w_t^1, w_t^2, \ldots, w_t^N)$$

where $w_t^i$, i=1, 2, . . . , N are values for the parameters to be calibrated by the hydrology forecasting model at the current time t.

Changes for the values for the parameters $w_t^i$ at the time t have two possibilities: increase or decrease; when a magnitude of increasing or decreasing the parameters $w_t^i$ is $\Delta^i$, and then a value $w_{t+1}^i$ for parameters at a time t+1 may be $w_t^i + \Delta^i$ or $w_t^i - \Delta^i$.

2-2) Determining the Action Space for the Reinforcement Learning:

The action space A for the reinforcement learning is defined as all possibilities for changes of each of the parameters to be calibrated:

$$A = \begin{bmatrix} \Delta_1^1 & \Delta_1^2 & \Delta_1^3 & \cdots & \Delta_1^{N-1} & \Delta_1^N \\ -\Delta_2^1 & \Delta_2^2 & \Delta_2^3 & \cdots & \Delta_2^{N-1} & \Delta_2^N \\ -\Delta_3^1 & -\Delta_3^2 & \Delta_3^3 & \cdots & \Delta_3^{N-1} & \Delta_3^N \\ \vdots & \vdots & \vdots & \cdots & \vdots & \vdots \\ \Delta_{2^N-1}^1 & \Delta_{2^N-1}^2 & \Delta_{2^N-1}^3 & \cdots & \Delta_{2^N-1}^{N-1} & \Delta_{2^N-1}^N \\ \Delta_{2^N}^1 & -\Delta_{2^N}^2 & \Delta_{2^N}^3 & \cdots & \Delta_{2^N}^{N-1} & \Delta_{2^N}^N \end{bmatrix},$$

where $2^N$ is a number of actions in the action space for the reinforcement learning; each row of matrix A is a selected action, that is, the possible values for an action value $a_t$ at the time t.

2-3), Determining the Reward Value Function for the Reinforcement Learning:

$Q_r=[q_r{}^1, q_r{}^2, q_r{}^3, \ldots, q_r{}^i, \ldots, q_r{}^M]$ is set as flow values actually measured during M time periods, where $q_r{}^i$, i=1, 2, 3, . . . , M is a flow value actually measured during an i-th time period;

The predicted flow sequences are acquired through the hydrology forecasting model according to a state $s_t=(w_t{}^1, w_t{}^2, \ldots, w_t{}^N)$ at the time t and a state $s_{t+1}=w_{t+1}{}^1, w_{t+1}{}^1, w_{t+1}{}^1, \ldots, w_{t+1}{}^N)$ at the time t+1 respectively as $$Q_t=[q_t{}^1, q_t{}^2, q_t{}^3, \ldots, q_t{}^i, \ldots, q_t{}^M] \text{ and}$$

$$Q_{t+1}=[q_{t+1}{}^1, q_{t+1}{}^2, q_{t+1}{}^3, \ldots, q_{t+1}{}^i, \ldots, q_{t+1}{}^M],$$

where $q_t{}^i$, $q_{t+1}{}^i$i=1, 2, 3, . . . , M are flow values forecasted at the time t and the time t+1 during the i-th time period, respectively.

A root mean square error at the time t is defined as $RMS_t$, and a root mean square error at the time t+1 is defined as $RMS_{t+1}$, where $$RMS_t = \sqrt{\frac{\sum_{i=1}^{M}(q_t^i - q_r^i)^2}{M}} \text{ and}$$

$$RMS_{t+1} = \sqrt{\frac{\sum_{i=1}^{M}(q_{t+1}^i - q_r^i)^2}{M}}.$$

A reward value $r_t(s_t, a_t, s_{t+1})$ obtained by executing an action $a_t$ in a state $s_t$ at the time t to reach a state $s_{t+1}$ at the time t+1 is defined as follows:

$$r_t(s_t, a_t, s_{t+1}) = \begin{cases} C_1 & RMS_t > RMS_{t+1} \\ 0 & RMS_t = RMS_{t+1} \text{ and} \\ C_2 - \sigma C_3 & RMS_t < RMS_{t+1} \end{cases}$$

$$\sigma = \begin{cases} 0 & \forall w_t^i \in (w_{min}^i, w_{max}^i) \\ 1 & \exists w_t^i \notin (w_{min}^i, w_{max}^i) \end{cases} i = 1, 2, 3, \ldots, M,$$

where $C_1$ is a constant greater than 0; $C_2$ is a constant less than 0; and 3 is a constant greater than 0.

Furthermore, the process of applying a deep reinforcement learning method DQN to optimize the parameters to be calibrated by the hydrology forecasting model in Step 3 includes the followings.

The following DQN algorithm for the reinforcement learning is performed according to the determined key elements of the reinforcement learning:

Input: a capacity of an experience pool D is initialized as N;

an action value network Q is initialized with a random weight θ; and
a target action value network Q̂ is initialized with a weight θ'=θ;
the process is as follows:
For 1, M do,
  initializing a state $s_t$;
  For t=1, T do,
    selecting a random action $a_t$ according to a probability ε, selecting $a_t$=argmax$_a$Q($s_t$, a; θ) according to a probability 1–ε;
    performing the action $a_t$ and acquiring a reward $r_t$ to obtain a next state $s_{t+1}$;
    storing ($s_t$, $a_t$, $r_t$, $s_{t+1}$) in the experience pool D;
    randomly selecting, when a certain number is reached in the experience pool D, a plurality of groups ($s_t$, $a_t$, $r_t$, $s_{t+1}$) as mini-batches;
  it is set as follows:

$$y_j = \begin{cases} r_j \\ r_j + \gamma \max_{a'} \hat{Q}(s_{j+1}, a'; \theta') \end{cases},$$

if a curtain ends in a j+1 i-th step, else;
    performing a gradient descent step of $(y_j-Q(s_j, a_j; \theta))^2$ to update the parameter θ of the action value network;
    resetting the target action value network Q̂=Q per C steps;
  End For
End For;
Output: an optimal state of $s_*=(w_*{}^1, w_*{}^2, w_*{}^3, \ldots, w_*{}^N)$.

Furthermore, when an optimization curve of the DQN algorithm reaches a state of convergence, a reward value in total is in a state of slight jitter at this time, and parameter values optimally calibrated are $s_*=(w_*{}^1, w_*{}^2, w_*{}^3, \ldots, w_*{}^N)$.

Compared with the prior art, the present disclosure has the following advantages and beneficial effects.

1. In the present disclosure, by setting a stride length of the action value for the deep reinforcement learning model, an accuracy optimized by the calibration parameters can be freely controlled with respect to the calibration parameters for different properties to ensure the accuracy and rationality for optimizing the calibration parameters, and to avoid investing too much calculation resources into non-important parameters.

2. In the present disclosure, a DQN algorithm is adopted to search the entire space for the calibration parameters to ensure the optimality for optimizing the calibration parameters through self-decision-making and corrective abilities of the reinforcement learning, so as to avoid the problem that modern intelligent algorithms are premature and prone to falling into local optimal solutions.

DETAILED DESCRIPTION OF THE EMBODIMENTS

The present disclosure provides a method for calibrating parameters of a hydrology forecasting model based on a deep reinforcement learning. The method includes the following steps. An appropriate hydrology forecasting model is selected according to basin characteristics, and the parameters and parameter value ranges calibrated by the model are determined; three elements of the reinforcement learning, that is, a state space, an action space and a reward function are constructed; a deep reinforcement learning method DQN is applied to optimize the parameters calibrated by the hydrology forecasting model. In the present disclosure, by setting a stride length of the action value for the deep reinforcement learning model, an accuracy finally optimized by the calibration parameters can be freely controlled, and a DQN algorithm is adopted to search the entire space for the calibration parameters to ensure the optimality for optimizing the calibrated parameters, so as to avoid the problem that modern intelligent algorithms are premature and prone to falling into local optimal solutions.

The present disclosure will be further described in detail below in combination with the accompanying drawings.

Figure 1:
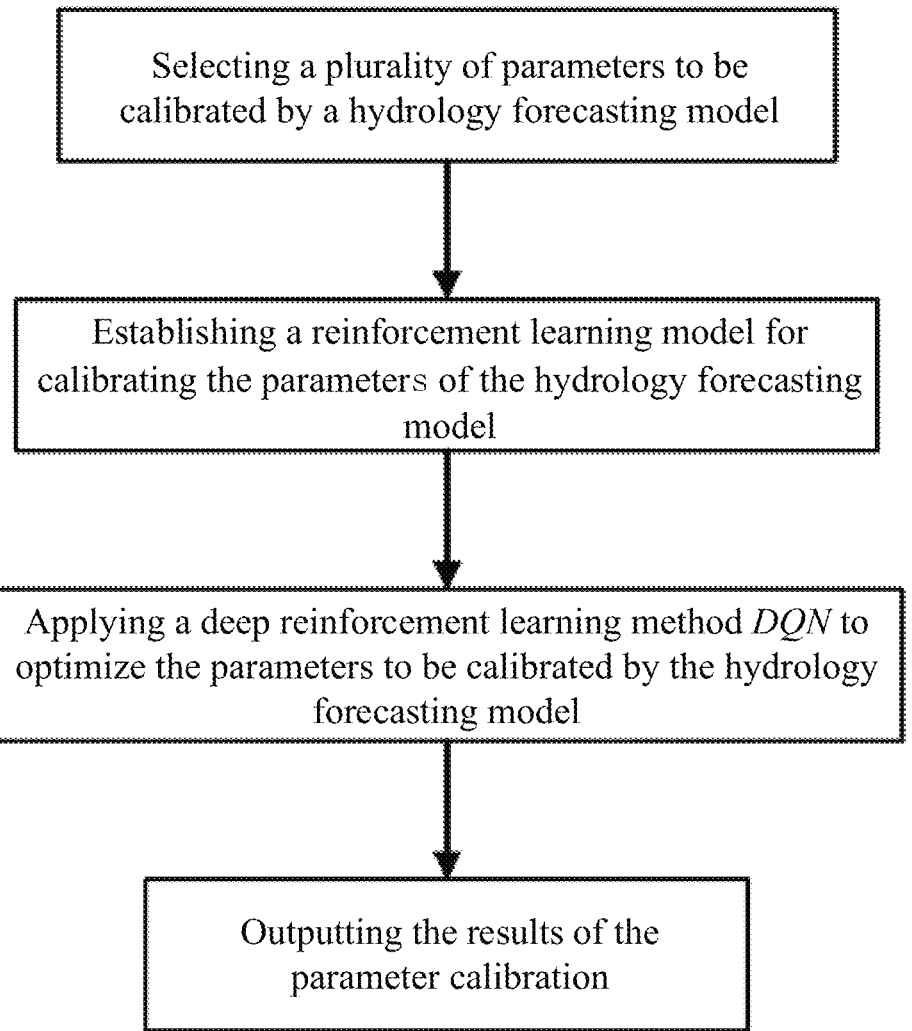
FIG. 1 illustrates a flowchart of a method according to an embodiment of the present disclosure.

FIG. 1 illustrates a flowchart of a method according to an embodiment of the present disclosure. As illustrated in FIG. 1, the method in this embodiment includes the following steps.

In Step 1, a hydrology forecasting model is selected and parameters that need to be calibrated are determined.

Figure 2:
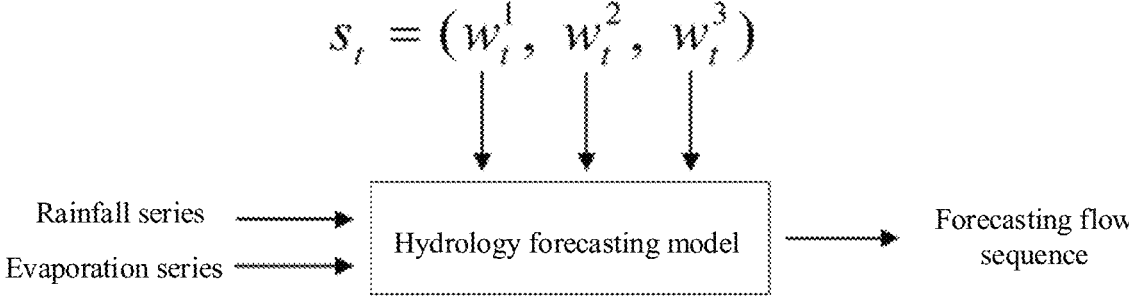
FIG. 2 illustrates a schematic diagram of a hydrology forecasting model according to an embodiment of the present disclosure.

As illustrated in FIG. 2, a different hydrology forecasting model is selected according to basin characteristics, the hydrology forecasting model takes a rainfall time sequence and an evaporation time sequence as inputs of the hydrology forecasting model, and takes a time sequence of a forecasted flow as an output of the hydrology forecasting model. The parameters $w^i$, i=1, 2, . . . , N that need to be calibrated by the hydrology forecasting model are determined, where N is a number of parameters that need to be calibrated by the hydrology forecasting model.

The value for each of the parameters is in a range of $$w^i_{min} \leq w^i \leq w^i_{max}, i = 1, 2, \ldots, N,$$

where $w_{min}{}^i$ and $w_{max}{}^i$ are a minimum value and a maximum value for an i-th parameter to be calibrated, respectively.

In Step 2, a reinforcement learning model for calibrating the parameters of the hydrology forecasting model is established.

Figure 3:
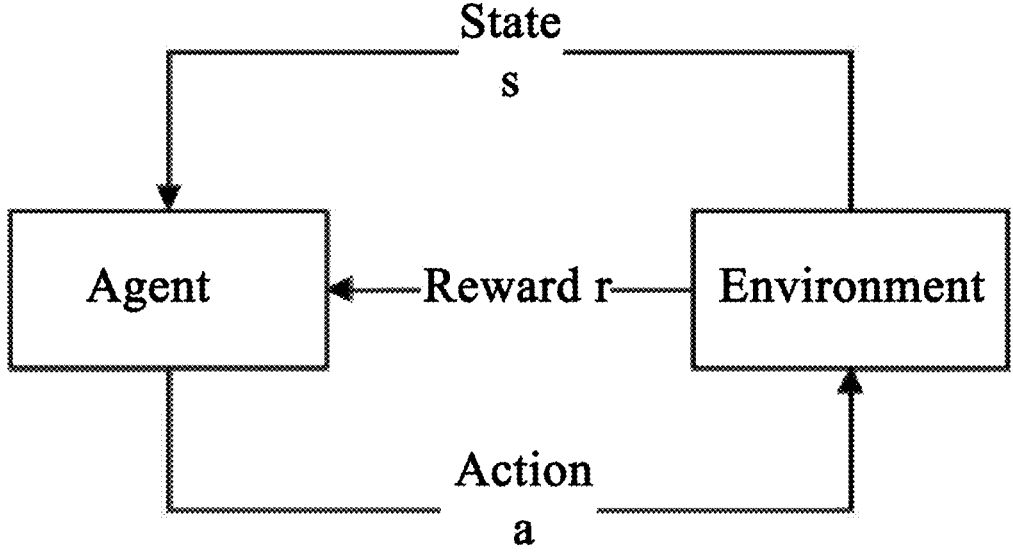
FIG. 3 illustrates a schematic diagram of a reinforcement learning according to an embodiment of the present disclosure.

As illustrated in FIG. 3, the reinforcement learning is the process of an interactive learning between an intelligent agent Agent and the environment. The agent can take corresponding actions according to the current state of the environment, so as to change the current state of the environment. Three key elements for the reinforcement learning are a state space, an action space and a reward value function.

(1) Determining the State Space for the Reinforcement Learning:

The state value for the reinforcement learning at a time t is defined as a one-dimensional vector $s_t$ composed of the plurality of parameters to be calibrated by the hydrology forecasting model;

$$s_t=(w_t{}^1, w_t{}^2, \ldots, w_t{}^N)$$

where $w_t{}^i$, i=1, 2, . . . , N are values for the parameters to be calibrated by the hydrology forecasting model at the current time t.

Changes for the values $w_t{}^i$ for the parameters at the time t have two possibilities: increase or decrease; when a magnitude of increasing or decreasing the parameters $w_t{}^i$ is both $\Delta^i$, then the values $w_{t+1}{}^i$ for the parameters at a time t+1 may be $w_t{}^i + \Delta^i$ or $w_t{}^i - \Delta^i$).

(2) Determining the action space for the reinforcement learning is determined:

The action space A for the reinforcement learning is defined as all possibilities where each of the parameters to be calibrated changes:

$$A = \begin{bmatrix} \Delta_1^1 & \Delta_1^2 & \Delta_1^3 & \ldots & \Delta_1^{N-1} & \Delta_1^N \\ -\Delta_2^1 & \Delta_2^2 & \Delta_2^3 & \ldots & \Delta_2^{N-1} & \Delta_2^N \\ -\Delta_3^1 & -\Delta_3^2 & \Delta_3^3 & \ldots & \Delta_3^{N-1} & \Delta_3^N \\ \vdots & \vdots & \vdots & \ldots & \vdots & \vdots \\ \Delta_{2^N-1}^1 & \Delta_{2^N-1}^2 & \Delta_{2^N-1}^3 & \cdots & \Delta_{2^N-1}^{N-1} & \Delta_{2^N-1}^N \\ \Delta_{2^N}^1 & -\Delta_{2^N}^2 & \Delta_{2^N}^3 & \cdots & \Delta_{2^N}^{N-1} & \Delta_{2^N}^N \end{bmatrix},$$

where $2^N$ is a number of actions in the action space for the reinforcement learning; each row of matrix A is a selected action, that is, the possible values for an action value $a_t$ at the time t. For example, when N=2 and $\Delta^1=\Delta^2=0.1$, then $$A = \begin{bmatrix} 0.1 & 0.1 \\ -0.1 & 0.1 \\ 0.1 & -0.1 \\ -0.1 & -0.1 \end{bmatrix}.$$

The possible values for $a_t$ at this time are [0.1, 0.1], [−0.1, 0.1], [0.1, −0.1], [−0.1, −0.1].

(3) Determining the Reward Value Function for the Reinforcement Learning:

$Q_r=[q_r{}^1, q_r{}^2, q_r{}^3, \ldots, q_r{}^i, \ldots, q_r{}^M]$ is set as flow values actually measured during M time periods, where $q_r{}^i$, i=1, 2, 3, . . . , M is a flow value actually measured during an i-th time period.

The predicted flow sequences acquired through the hydrology forecasting model according to a states $s_t=(w_t{}^1, w_t{}^2, \ldots, w_t{}^N)$ at the t time and a state $s_{t+1}=(w_{t+1}{}^1, w_{t+1}{}^2, \ldots, w_{t+1}{}^N)$ at the t+1 time, are respectively as $$Q_t=[q_t{}^1, q_t{}^2, q_t{}^3, \ldots, q_t{}^i, \ldots, q_t{}^M] \text{ and}$$

$$Q_{t+1}=[q_{t+1}{}^1, q_{t+1}{}^2, q_{t+1}{}^3, \ldots, q_{t+1}{}^i, \ldots, q_{t+1}{}^M],$$

where $q_t{}^i$, $q_{t+1}{}^i$ i=1, 2, 3, . . . , M are flow values forecasted at the time t and the time t+1 during the i-th time period, respectively.

A root mean square error at the time t is defined as RAl $s_t$, and a root mean square error at the time t+1 is defined as $RMS_{t+1}$ where $$RMS_t = \sqrt{\frac{\sum_{i=1}^{M}(q_t^i - q_r^i)^2}{M}} \quad \text{and}$$

$$RMS_{t+1} = \sqrt{\frac{\sum_{i=1}^{M}(q_{t+1}^i - q_r^i)^2}{M}}.$$

A reward value $r_t(s_t, a_t, s_{t+1})$ obtained by executing an action $a_t$ in a state $s_t$ at the time t to reach a state $s_{t+1}$ at the time t+1 is defined as follows:

$$r_t(s_t, a_t, s_{t+1}) = \begin{cases} C_1 & RMS_t > RMS_{t+1} \\ 0 & RMS_t = RMS_{t+1} \\ C_2 - \sigma C_3 & RMS_t < RMS_{t+1} \end{cases} \quad \text{and}$$

$$\sigma = \begin{cases} 0 & \forall\, w_t^i \in (w_{min}^i, w_{max}^i) \\ 1 & \exists\, w_t^i \notin (w_{min}^i, w_{max}^i) \end{cases} \quad i = 1, 2, 3, \ldots, M,$$

where $C_1$ is a constant greater than 0; $C_2$ is a constant less than 0; and $C_3$ is a constant greater than 0.

In Step 3, a deep reinforcement learning method DQN is applied to optimize the parameters to be calibrated by the hydrology forecasting model.

Figure 4:
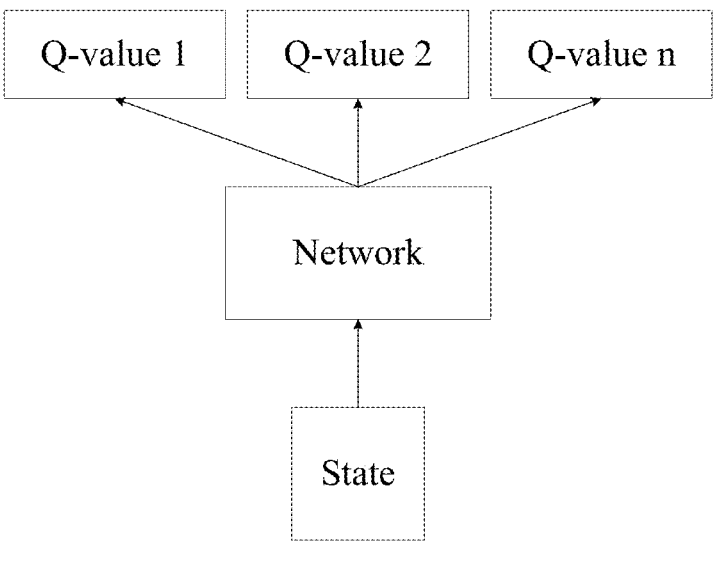
FIG. 4 illustrates a schematic diagram of an action value network and a target action value network according to an embodiment of the present disclosure.

As illustrated in FIG. 4, provided is a schematic diagram of an action value network and a target action value network. In the network, the states are taken as the input neurons, and the input number is the number of parameters needed to be calibrated by the hydrology forecasting model. The action values are taken as the outputs, and the number of output values is the number of actions in the action space. The action value network is a value function used to evaluate a pair of the current state actions, and the reason why using a design of a neural network is that there are many states. The target action value network is used to gradually update the Q value. The parameters in the network are updated through the algorithm according to the updating formula of the loss function. After each C rounds of iterations, the parameters in the action value network are copied to the parameters in the target action value network. $Q(s_j, a_j; \theta)$ of the target action value network remains unchanged within a period of time, which reduces the possibility of oscillation and divergence of the loss value during training, thereby improving the stability of the algorithm.

Figure 5:
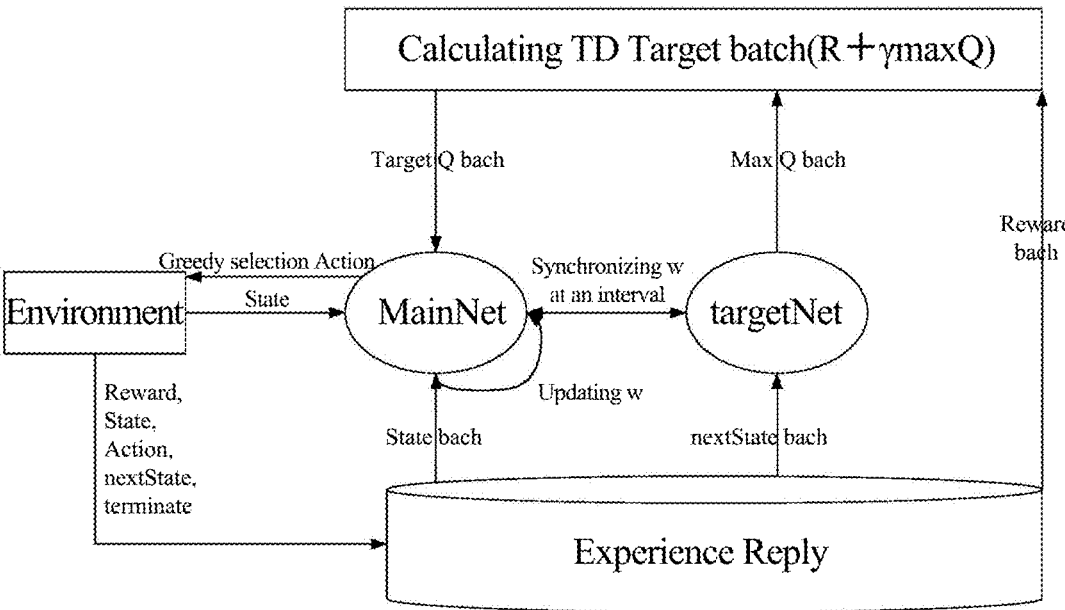
FIG. 5 illustrates a flowchart of an optimization algorithm of DQN according to an embodiment of the present disclosure.

As illustrated in FIG. 5, provided is a flowchart of a DQN optimization algorithm, in which MainNet is the action value network and targetNet is the target action value network. The DQN algorithm for the reinforcement learning is executed according to the key elements of the reinforcement learning determined in Step 2, and the procedure is as follows.

Input: a capacity of an experience pool D is initialized as N;

an action value network Q is initialized with a random weight $\theta$, and the input and output of the network are illustrated by FIG. 4;

a target action value network $\hat{Q}$ is initialized with a weight $\theta'=\theta$ and the input and output of the network are illustrated by FIG. 4;

the process is as follows:

For 1, M do, randomly initializing a state $s_1=(w_0^1, w_0^2, w_0^3, \ldots, w_0^N)$ For t=1, T do, selecting a random action $a_t$ according to a probability $\varepsilon$ ($\varepsilon$ is a smaller value), selecting $a_t=\text{argmax}_a Q(s_t, a; \theta)$ according to a probability $1-\varepsilon$, which are calculated by the action value network;

performing the action $a_t$ to obtain a next state $s_{t+1}=(w_{t+1}^1, w_{t+1}^2, \ldots, w_{t+1}^N$; and acquiring a reward $r_t$ where $r_t$ is obtained from the calculation formula of Step 2;

storing $(s_t, a_t, r_t, s_{t+1})$ in the experience pool D, where at this time, it is necessary to determine whether the capacity of the experience pool is full, and when the capacity is full, the experience pool D can be updated by using the first-in and first-out strategy;

when a certain number is reached in the experience pool D, randomly selecting a plurality of groups $(s_t, a_t, r_t, s_{t+1})$ from the experience pool D as learning samples for a neural network;

It is obtained in the target action value network as:

$$y_j = \begin{cases} r_j \\ r_j + \gamma \max_{a'}\hat{Q}(s_{j+1}, a'; \theta') \end{cases}$$

if a curtain ends in a j+1-th step, else;

performing a gradient descent step of $(y_j - Q(s_j, a_j; \theta))^2$ by the action value network to update the network parameter $\theta$;

resetting the target action value network $\hat{Q}=Q$ per C steps, which means that the parameter $\theta$ for the action value network is set as the parameter $\theta'$ for the target action value network;

End For

End For;

Output: an optimal state: $s_*=(w_*^1, w_*^2, w_*^3, \ldots, w_*^N)$.

When an optimization curve of the algorithm of DQN reaches a state of convergence, a total reward value is in a state of slight jitter at this time, and parameter values optimally calibrated are $s_*=(w_*^1, w_*^2, w_*^3, \ldots, w_*^N)$.

What is claimed is:

1. A method for calibrating parameters of a hydrology forecasting model based on a deep reinforcement learning, characterized by comprising following steps:

Step 1, selecting a hydrology forecasting model and determining parameters that need to be calibrated, wherein the hydrology forecasting model takes a rainfall time sequence and an evaporation time sequence as inputs, and takes a time sequence of a forecasted flow as an output;

Step 2, establishing a reinforcement learning model for calibrating the parameters of the hydrology forecasting model, wherein the reinforcement learning refers to a process of an interactive learning between an intelligent agent Agent and environment, and three key elements for the reinforcement learning are a state space, an action space and a reward value function; and Step 3, applying a deep reinforcement learning method DON to optimize the parameters to be calibrated by the hydrology forecasting model;

wherein the process of establishing the reinforcement learning model for calibrating the parameters of the hydrology forecasting model in Step 2 comprises:

2-1) determining the state space for the reinforcement learning to obtain the parameters to be calibrated for the hydrology forecasting model, specifically:

defining the state value for the reinforcement learning at a time t as a one-dimensional vector $S_t$ composed of the plurality of parameters to be calibrated by the hydrology forecasting model;

$$s_t = (w_t^1, w_t^2, \ldots, w_t^N)$$

wherein $w_t^i = 1, 2, \ldots, N$ are values for the parameters to be calibrated by the hydrology forecasting model at the current time t; and changes for the values $w_t^i$ for the parameters at the time t have two possibilities: increase or decrease; when a magnitude of increasing or decreasing the parameters $w_t^i$ is both $\Delta^i$, a value $w_{t+1}^i$ for the parameters at a time t+1 may be $w_t^i + \Delta^i$ or $w_t^i - \Delta^i$;

2-2) determining the action space for the reinforcement learning to obtain an action value for calibrating the parameters for the hydrology forecasting model, wherein the action value is set to control an accuracy for the parameters after calibration to control an accuracy for the hydrology forecasting model, specifically:

defining the action space A for the reinforcement learning as all possibilities where each of the parameters to be calibrated changes:

$$A = \begin{bmatrix} \Delta_1^1 & \Delta_1^2 & \Delta_1^3 & \ldots & \Delta_1^{N-1} & \Delta_1^N \\ -\Delta_2^1 & \Delta_2^2 & \Delta_2^3 & \ldots & \Delta_2^{N-1} & \Delta_2^N \\ -\Delta_3^1 & -\Delta_3^2 & \Delta_3^3 & \ldots & \Delta_3^{N-1} & \Delta_3^N \\ \vdots & \vdots & \vdots & \ldots & \vdots & \vdots \\ \Delta_{2^N-1}^1 & \Delta_{2^N-1}^2 & \Delta_{2^N-1}^3 & \cdots & \Delta_{2^N-1}^{N-1} & \Delta_{2^N-1}^N \\ \Delta_{2^N}^1 & -\Delta_{2^N}^2 & \Delta_{2^N}^3 & \cdots & \Delta_{2^N}^{N-1} & \Delta_{2^N}^N \end{bmatrix}$$

wherein $2^N$ is a number of actions in the action space for the reinforcement learning; each row of matrix A is a selected action, that is, possible values for an action value $a_t$ at the time t; and 2-3) determining the reward value function for the reinforcement learning to obtain a reward value through comparing flow values actually measured and flow values forecasted by the hydrology forecasting model to further calibrate the parameter for the hydrology forecasting model, specifically;

setting $Q_r = [q_r^1, q_r^2, q_r^3, \ldots, q_r^i, \ldots, q_r^M]$ as flow values actually measured during M time periods, wherein $q_r^i$, i=1, 2, 3, . . . , M is a flow value actually measured during an i-th time period; and acquiring, according to a state $s_t = (w_t^1, w_t^2, \ldots, w_t^N)$ at the t time and a state $s_{t+1} = (w_{t+1}^1, w_{t+1}^2, \ldots, w_{t+1}^N)$ at the t+1 time, through the hydrology forecasting model, predicted flow sequences respectively as follows:

$$Q_t = [q_t^1, q_t^2, q_t^3, \ldots, q_t^i, \ldots, q_t^M]$$

$$Q_t = [q_{t+1}^1, q_{t+1}^2, q_{t+1}^3, \ldots, q_{t+1}^i, \ldots, q_{t+1}^M]$$

wherein $q_t^i$, $q_{t+1}^i$ i=1, 2, 3, . . . , M are flow values forecasted at the time t and the time t+1 during the i-th time period, respectively;

defining a root mean square error at the time t as $RMS_t$, and a root mean square error at the time t+1 as $RMS_t+1$:

$$RMS_t = \sqrt{\frac{\sum_{i=1}^{M}(q_t^i - q_r^i)^2}{M}}$$

-continued $$RMS_{t+1} = \sqrt{\frac{\sum_{i=1}^{M}(q_{t+1}^i - q_r^i)^2}{M}}$$

defining a reward value $r_t(s_t, a_t, s_{t+1})$ obtained by executing an action at in a state $s_t$ at the time t to reach a state $s_t+1$ at the time t+1:

$$r_t(s_t, a_t, s_{t+1}) = \begin{cases} C_1 & RMS_t > RMS_{t+1} \\ 0 & RMS_t = RMS_{t+1} \\ C_2 - \sigma C_3 & RMS_t < RMS_{t+1} \end{cases}$$

$$\sigma = \begin{cases} 0 & \forall w_t^i \in (w_{min}^i, w_{max}^i) \\ 1 & \exists w_t^i \notin (w_{min}^i, w_{max}^i) \end{cases} \quad i = 1, 2, 3, \ldots, M$$

wherein $C_1$ is a constant greater than 0; $C_2$ is a constant less than 0; and $C_3$ is a constant greater than 0.

2. The method for calibrating the parameters of the hydrology forecasting model based on the deep reinforcement learning according to claim 1, characterized in that the process of selecting the hydrology forecasting model and determining the plurality of parameters to be calibrated in Step 1 comprises:

selecting a different hydrology forecasting model according to basin characteristics, and determining the parameters $w^i$, i=1,2, . . . , N that need to be calibrated by the hydrology forecasting model, where N is a number of the parameters that need to be calibrated by the hydrology forecasting model;

wherein each of the parameters is in a range of:

$$w_{min}^i \leq w^i \leq w_{max}^i, i = 1, 2, \ldots, N$$

wherein $w_{min}^i$ and $w_{max}^i$ are a minimum value and a maximum value for an i-th parameter to be calibrated, respectively.

3. The method for calibrating the parameters of the hydrology forecasting model based on the deep reinforcement learning according to claim 1, characterized in that the process of applying the deep reinforcement learning method DQN to optimize the parameters to be calibrated by the hydrology forecasting model in Step 3 comprises:

performing, according to the determined key elements of the reinforcement learning, a following DQN algorithm for the reinforcement learning:

inputting: initializing a capacity of an initialized experience pool D as N;

initializing an action value network Q with a random weight θ;

initializing a target action value network $\hat{Q}$ with a weight θ'=θ;

the process is as follows:

For 1, M do initializing a state $s_1$;

For t=1, T do selecting a random action $a_t$ according to a probability ε, selecting $a_t = argmax_a Q(s_t, a; θ)$ according to a probability 1−ε;

performing the action $a_t$ and acquiring a reward $r_t$ to get a next state $s_{t+1}$;

storing $(s_t, a_t, r_t, s_{t+1})$ in the experience pool D;

randomly selecting, when a certain number is reached in the experience pool, a plurality of groups ($s_t$, $a_t$, $r_t$, $s_{t+1}$) as mini-batches;

setting $$y_j = \begin{cases} r_j \\ r_j + \gamma \max_{a'} \hat{Q}(s_{j+1}, a'); \end{cases}$$

if a curtain ends in a (j+1)-th step else performing a gradient descent step of $(y_j - Q(s_j, a_j; \theta))^2$ to update the parameter $\theta$ of the action value network;

resetting the target action value network per C steps;

End For

End For

Outputting an optimal state $s_*=(w_*^1, w_*^2, w_*^3, \ldots, w_*^N)$.

4. The method for calibrating the parameters of the hydrology forecasting model based on the deep reinforcement learning according to claim 3, characterized in that when an optimization curve of the DQN algorithm reaches a state of convergence, a reward value in total is in a state of slight jitter, and parameter values optimally calibrated are $s_*=(w_*^1, w_*^2, w_*^3, \ldots, w_*^N)$.

* * * * *